United States Patent [19]
Kucik

[11] Patent Number: 5,366,400
[45] Date of Patent: Nov. 22, 1994

[54] APPARATUS AND METHOD FOR DRAINING OUT THE RESIDUAL OIL IN A REPLACEABLE OIL FILTER USED IN A MARINE ENGINE FOR AVOIDING POLLUTION TO THE ENVIRONMENT WHEN CHANGING FILTERS

[76] Inventor: Michael Kucik, 4603 Hazelwood Ave., Baltimore, Md. 21206

[21] Appl. No.: 173,659
[22] Filed: Dec. 27, 1993
[51] Int. Cl.$^5$ ............................................. B63H 21/10
[52] U.S. Cl. ............................ 440/88; 210/DIG. 17
[58] Field of Search ............... 210/168, 238, DIG. 17; 440/88

[56] References Cited

U.S. PATENT DOCUMENTS

| | | | |
|---|---|---|---|
| 1,731,209 | 10/1929 | Champion . | |
| 1,982,376 | 11/1934 | Lancey | 210/DIG. 17 |
| 2,049,498 | 8/1936 | Hardinge | 210/DIG. 17 |
| 2,533,266 | 12/1950 | Kovacs et al. | 210/DIG. 17 |
| 3,380,593 | 12/1965 | Uhen et al. . | |
| 3,912,633 | 10/1975 | Delaney | 210/DIG. 17 |
| 4,101,000 | 7/1978 | Scully | 184/1.5 |
| 4,106,689 | 8/1978 | Kozulla | 233/23 R |
| 4,167,483 | 9/1979 | Rosaen et al. | 210/130 |
| 4,815,566 | 3/1989 | Caruso et al. | 184/1.5 |
| 4,875,884 | 10/1989 | Meisenburg | 440/88 |
| 4,909,205 | 3/1990 | Bewley, III | 123/196 S |
| 4,977,978 | 12/1990 | Batrice | 184/1.5 |
| 4,986,777 | 1/1991 | Preston | 440/88 |
| 5,038,578 | 8/1991 | Manz et al. | 62/292 |
| 5,074,379 | 12/1991 | Batrice | 184/1.5 |
| 5,086,522 | 2/1992 | Stofko, Sr. | 4/295 |
| 5,110,460 | 5/1992 | Gilas | 210/DIG. 17 |
| 5,196,112 | 3/1993 | Eichman | 210/171 |
| 5,199,914 | 4/1993 | Marsh | 440/88 |

OTHER PUBLICATIONS

Hastings Lifeguard TM Filters—1993 catalog; cover of catalog, inside cover of Hastings Lifeguard TM Oil Filters (no drain), pp. 810–811 listing Diesel fuel filters (with drain–cock)—yellow highlights, p. 856, showing line drawings of Diesel fuel filters L9, L10, and L11 having drain–cocks.
E&B Discount Marine—Cover of catalog, p. 69, Gas & Diesel Fuel Filters.
Boat/U.S. 1994 Annual Equipment Catalog—cover of catalog, pp. 169–173 showing fuel filters and gas filters (with drains) and an oil filter, p. 173 (without a drain).
WIX Filters—Cover, p. 661, Installation Instructions For Automotive Spin–On Oil Filters (no drain), p. 638, Universal Fuel/Water Separator Filter Installation Kit (with drain).

Primary Examiner—Stephen P. Avila
Attorney, Agent, or Firm—Leonard Bloom

[57] ABSTRACT

The invention is directed to an oil filter cartridge containing a sealed out-let orifice which can be opened to allow for efficient oil recovery. An oil filter cartridge with an outlet valve is considered to be part of the claimed invention. The oil filter cartridge with attached valve is particularly beneficial for use on marine engines where quarters are cramped and the chance for water pollution due to oil spill is great.

6 Claims, 10 Drawing Sheets

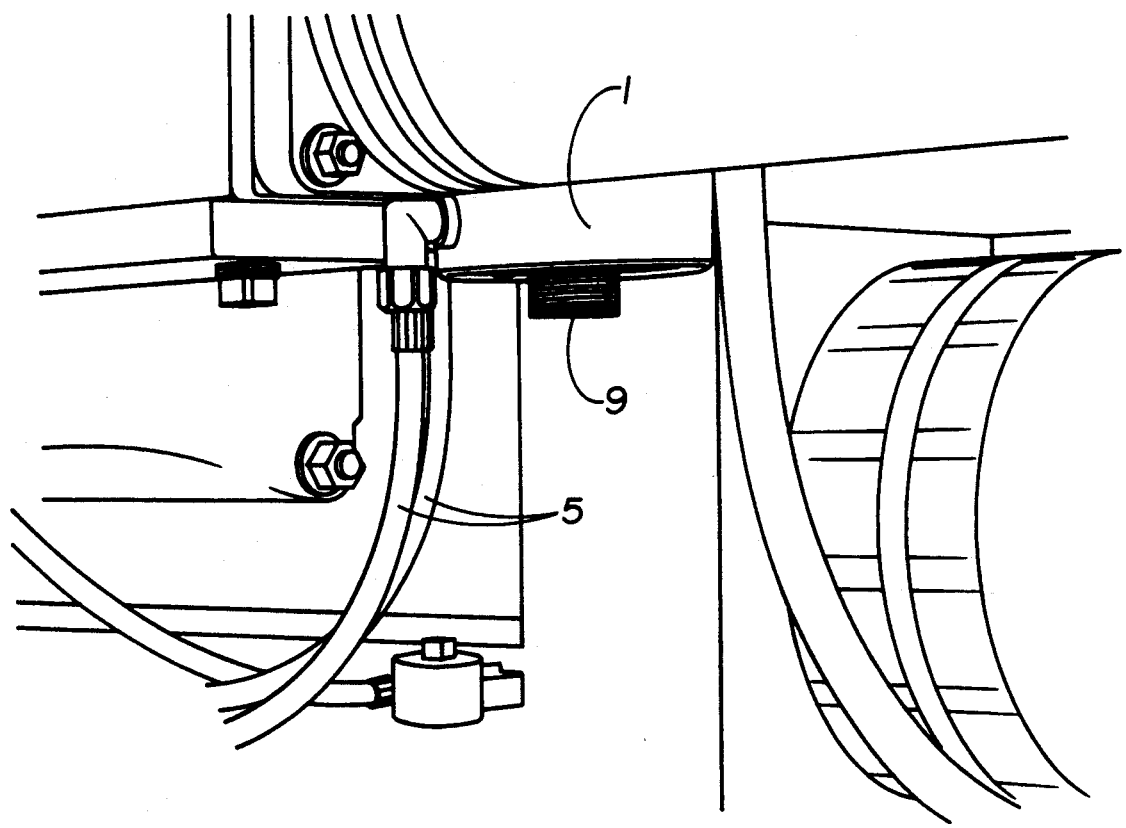
FIG.9
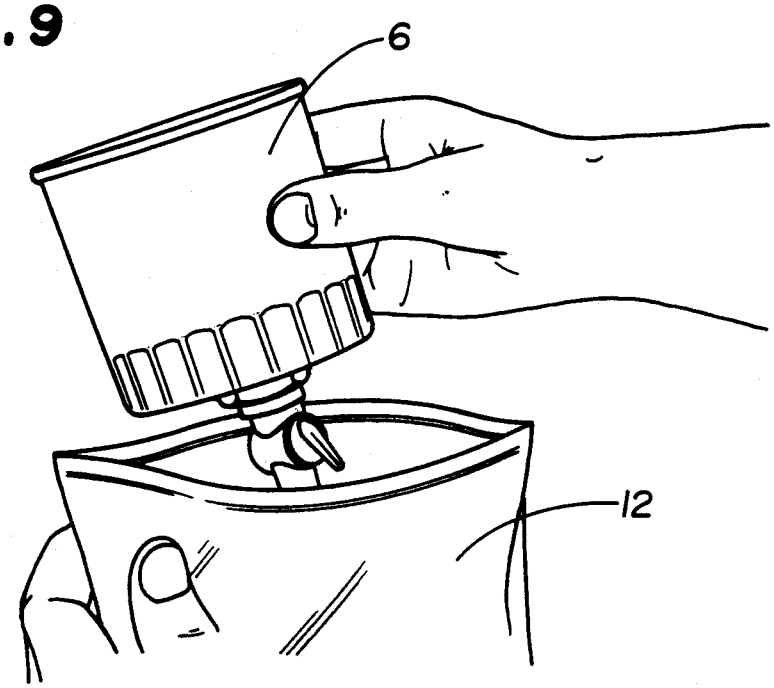

APPARATUS AND METHOD FOR DRAINING OUT THE RESIDUAL OIL IN A REPLACEABLE OIL FILTER USED IN A MARINE ENGINE FOR AVOIDING POLLUTION TO THE ENVIRONMENT WHEN CHANGING FILTERS

BACKGROUND OF THE INVENTION

The present invention relates to an oil filter cartridge having a means attached thereto for removing residual oil from the cartridge after the engine has been drained of oil and before the cartridge is removed.

In recent years, there has become a greater awareness on the part of government as well as the general public of the need to protect the environment. Amongst the problem areas of environmental pollution are the air, land and water; solid waste and automobile; industry such as manufacture and mining, wherein toxicity is caused by water run-off into various waterways and water pollution being caused by waste disposal of manufacturing by-products into waterways. The adverse affects of pollution are being felt by man, as well as animals and no environment is free from pollution.

Because of the problem of pollution affecting the health of man and animals, and the need to safely dispose of all sorts of products, there has become a greater awareness of the need to protect the environment from pollution.

We are all aware of steps being taken by the government to limit pollution and to protect the environment. For example, many pollution control devices have been installed by automobile manufacturers in an effort to limit air pollution. Many states have installed emission testing stations to insure that automobiles operate in a fashion to produce the least amount of air pollution.

A popular method of limiting solid pollution is recycling, and many communities have installed special bins for the collection of metal, paper, plastic or glass.

Because of the greater awareness of the need to protect the environment from pollution, Congress and the states are taking a closer look at waterways, such as rivers and lakes, the pollution therein and what is causing the pollution. Boating is being looked at as a source of pollution. Besides the fact that boats may cause pollution through exhaust gases caused by the engine and solid waste disposal, oil disposal is becoming a particular problem area of concern. Congress and the states are taking a closer look at boating, and they are considering new measures to control various forms of pollution. One of the areas in which greater care is needed to protect the environment is oil disposal from various types of engines. The disposal of oil in U.S. waters is strictly prohibited under federal law; and a substantial penalty can be imposed if this law is violated. There are 12 million boat owners so you can see that there is potentially a great area of concern regarding the issue of pollution.

Of course, new and additional regulations may be required to limit pollution; however, the simple changing of old habits by boat owners on a voluntary basis can materially limit pollution. The adoption of common-sense measures can make water pollution-free, and a more pleasant environment for recreation and commerce. Care should be taken in the use and disposal of products used to clean the boat's hull and deck. Of course, these cleaning products run off into the water when rinsed and are a source of pollution. Wood oils, polishes, solvents, acids and paints are obvious sources of pollution, and care should be taken with them in use as well as disposal. Because of environmental concerns, manufacturers are formulating environmentally safe, non-toxic, biodegradable products. These products in water degrade and therefore have a lesser polluting effect on the environment. Eliminated from these products are phosphates, caustics, acids, chlorine, toxic solvents and fluoronated hydrocarbons. This latter product is the agent suspected to be detrimental to the earth's ozone layer. For example, ships' horns which were once actuated by fluorohydrocarbons now use compressed air which can be replaced and put under pressure by the use of a pump.

The disposal of oil in the waterways is absolutely prohibited by law and subject to a $5,000 fine. Bilge "pillows" and engine compartment absorbent pads are used to soak up spilled oil. As can be readily discerned, the use of these absorbent devices is messy.

Recognizing the need to limit pollution, Boat/US has established a Clean Water Trust as a non-profit organization to initiate projects and to produce educational programs to limit boat pollution. There will be established a liaison between boating groups and environmental groups.

During prior art oil changes, residual oil from the filter cartridge would spill into the bilge and from there, it would be pumped out of the bilge. Of course, pumping bilge oil into the water is illegal and disposing of bilge oil pumped into a container is cumbersome because the oil is mixed with water and to dispose of the oil in a landfill presents a pollution problem. An advantage of the present invention is that residual oil from the filter is piped into a container where the oil can be recycled or disposed of with the container and the oil in the container is not mixed with water or other impurities as would be found in oil from the bilge and, therefore, recycling is facilitated.

1. Field of the Invention

Recognizing the problem of pollution by boats and in an effort to avoid oil pollution of water when changing the oil in marine engines, the present invention comprises a new method and apparatus which will facilitate the changing of oil in marine engines and will prevent the spilling of residual oil from the filter during oil changes.

The prior art in an effort to avoid oil spill used a large plastic bag placed over the oil filter cartridge as it was being unscrewed and removed after crankcase oil removal. The purpose of the plastic bag was to catch residual oil which spilled out during the oil filter cartridge unscrewing and removal.

As can be imagined, this method created a mess for the person removing the canister and was particularly difficult to perform in the cramped quarters of a boat engine compartment which was made more cramped by the multitude of adjacent hoses and pipes which run adjacent to the engine. Of course, this spilling of oil was the potential cause of pollution and a violation of pollution laws. Moreover, the oil-filled cartridge was difficult to dispose of without causing pollution.

2. Prior Art

U.S. Pat. No. 4,977,978 to Batrice shows an oil change apparatus for use in changing motor oil in a motor vehicle which includes a key-operated drain valve, and wherein the oil filter is relocated to a position which is convenient and easy to access. The oil drain plug is also relocated to a position making it easily accessible for oil change. A pump is also supplied to pump used engine oil and thereby make oil change easy and convenient. While the patent to Batrice may show a convenient method for changing oil, the patent does not show a valve on an oil cartridge to drain residual oil from the canister. Therefore, one using the device of Batrice would still be confronted with the spilling of residual oil when the canister per se was removed.

U.S. Pat. No. 5,074,379 to Batrice is directed to an oil filter relocation assembly which is designed to relocate oil filters which are generally placed in an inaccessible location. The oil filter cartridge is conveniently located but does not recognize the problem solved by applicant and, therefore, would have oil spillage when the filter cartridge is changed.

Bewley in U.S. Pat. No. 4,909,205 discloses a method and apparatus for changing oil and oil filter in an engine. The oil sump has an oil filter and oil is changed by draining the sump and connecting an external reservoir containing oil. When oil is needed in the engine, oil is pumped from the reservoir to the engine. The filter is changed by conventional means. There is no recognition by Bewley of how to prevent oil spillage during oil filter removal, nor does Bewley recognize a need to install a valve in the oil filter canister itself.

Disclosed by Meisenburg in U.S. Pat. No. 4,875,884 is a marine propulsion device with an engine and an oil pan depending downwardly from the engine; wherein a tube is used to remove oil from the oil pan and the oil is removed from the boat through a tube drain. The valve connected to the tube is opened and the oil is able to drain at a position outboard of the boat. Meisenburg does not involve itself with oil filters and does not recognize the problem or solution contemplated by the present invention. Meisenberg is cleaning the crankcase, not the filter.

U.S. Pat. No. 4,101,000 to Scully teaches an oil recovery device where the housing containing the filter is drained of oil. The engine is placed below the oil filter cartridge unit. The engines used by Scully are engines in military trucks, and the filters are positioned in an upstanding orientation with oil being pumped up into the filters. Scully has a drain opening in the bottom surface of the filter base. He has found the position which would be most convenient for an oil drain valve under the filter, but it is obstructed by mechanisms such as valves, liquid lines, electrical lines, etc. and, therefore, it would be impossible to position a container or funnel to collect the oil. Because of this deficiency, there results oil splashing and spilling. Scully does not contemplate, as a single screw-on unit, a valve in a canister housing for the release of residual oil when the oil filter canister is removed during an oil change. He does not recognize the problem solved by the present invention.

U.S. Pat. No. 5,196,112 to Eichman discloses an oil drain apparatus directed to an oil filter boss in association with a valve. In operation, the oil is drained through the filter device via a conduit adjacent to the filter. The filter is sideways on a special mounting bracket and would be difficult, if not impossible, to fit on a marine engine in the cramped quarters housing the marine engine.

Preston in U.S. Pat. No. 4,986,777 is directed to a marine engine oil drainage device for draining oil from an inboard engine, wherein the engine is within the cramped engine compartment. No disclosure in this reference of the removal of an oil filter cartridge during oil change.

U.S. Pat. No. 4,815,566 to Caruso et al is drawn to a convenient method of oil change, however no method for changing the oil filter canister is disclosed.

In short, none of the prior art devices show or suggest the valve-oil filter canister device herein disclosed.

OBJECTS OF THE INVENTION

Accordingly, it is the basic object of the invention to provide for a more efficient method of changing oil in engines and, in particular, in the replacement of the oil filter.

A further object is to eliminate oil-spill during oil changes, and, in particular, replacement of the oil filter as distinguished from draining the crankcase oil.

A still further object is to create an efficient system for saving waste oil after oil changes by piping oil into a container.

An object of great importance is the elimination of pollution caused by oil spills because residual oil is piped through a valve to a container, instead of into the bilge from where it can be pumped to cause the pollution of waterways.

Another object is the elimination of mess during oil changes because the valve on the filter cartridge allows for waste oil to be piped from a valve to a container for disposal.

A still further object is the benefit of disposal of an oil filter cartridge relatively free of residual oil.

A most important object is to create an easy method of changing oil in the cramped conditions of the engine quarters by the use of the filter cartridge with valve attached.

SUMMARY OF THE INVENTION

The present invention is designed to alleviate the difficulties of the prior art oil filter cartridge removal, as well as eliminating the possibility of oil spill and consequent pollution which would result. The object of this invention is accomplished by supplying an oil filter cartridge which has two openings. One of the openings is for attachment to an engine through a threaded member and the second opening is attached to a valve or equivalent device. In operation, engine oil is drained from the crank-case and then before removal of the oil filter canister, the valve on the canister is opened to remove residual oil in the canister. All the residual oil can be removed into a container, and the canister can be conveniently removed and discarded without fear of spilling oil and the old cartridge free of oil readily disposed of and the new cartridge easily installed.

The oil filter cartridge of the present invention is a container or canister enclosing an oil filter. The cartridge is fitted so as to be able to be attached to an engine, usually by being threaded at one end and with the cartridge having a valve means built in to the cartridge to drain residual oil during the changing of crankcase oil.

The valve drains residual oil contained in the cartridge. A hose can be attached to the valve to drain the residual oil in the cartridge into a container for non-polluting disposal. A petcock or sealed orifice can be used as an equivalent valve means to drain the residual oil from the cartridge.

It is to be understood that a marine engine presents unique problems regarding oil changing because of the close quarters of the engine compartment. Waste oil due to dripping and spilling drops to the bilge from where it is pumped out, possibly polluting the water and environment. The valved oil filter cartridge attached to the engine eliminates oil spillage when engine crankcase oil is changed because residual oil is drained from the valve on the filter cartridge into a container. The drained oil filter cartridge can be safely disposed of.

It is understood that the valve on the filter cartridge is firmly sealed so that the engine or boat vibration will not cause the valve to loosen and open to cause accidental spillage. The valve is designed so as to be opened when oil is changed, but not when the boat and engine are in ordinary use.

In a special embodiment of this invention, a marine engine within close quarters of an engine compartment having a bilge and a bilge pump for pumping out the bilge into the water; and wherein the engine crankcase contains a replaceable oil filter cartridge which is replaced following the drainage of oil from the crankcase with the residual oil from the oil filter cartridge instead of spilling into the bilge and the bilge pump pumping the waste oil into the water, the present invention has the improvement of having an oil filter cartridge having a bottom opening formed therein containing valve means carried by the oil filter cartridge and in communication with the bottom opening therein, such that after the oil has been drained from the crankcase, the valve means may be opened to drain the residual oil out of the oil filter cartridge and into a suitable container prior to removal of the oil filter cartridge, thereby preventing the residual oil from flowing into the bilge, and thereby preventing the water from being polluted when the bilge is pumped out. Finally, the cartridge free of oil can be removed and safely disposed of in an area such as a landfill without environmental pollution.

BRIEF DESCRIPTION OF THE DRAWINGS

FIG. 9 shows the oil filter cartridge being removed and discarded with no spill of residual oil in the filter.

DESCRIPTION OF THE PREFERRED EMBODIMENTS

Figure 1:
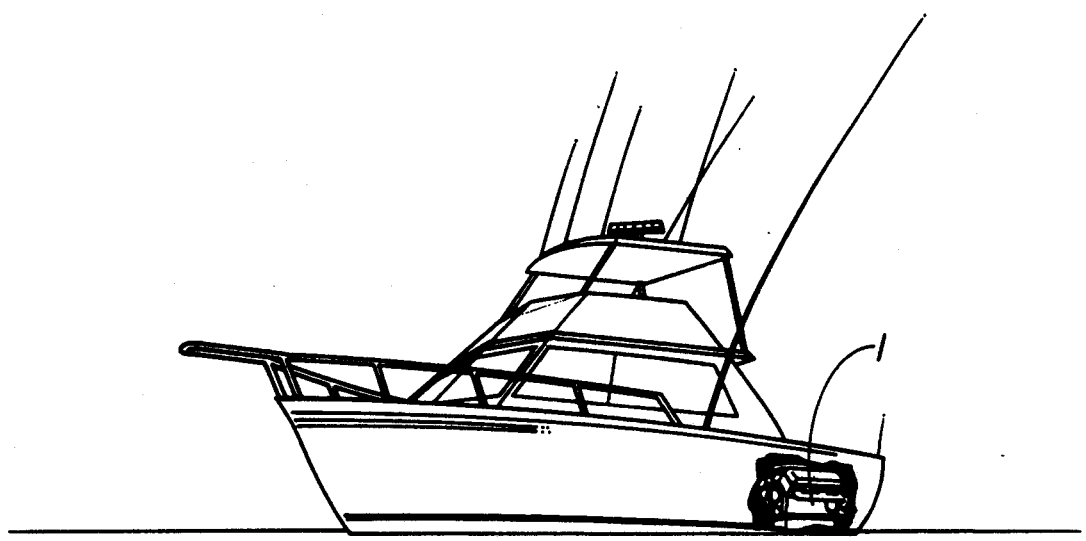
FIG. 1 is a perspective view of a conventional boat with part of the hull broken away to show the marine engine.
Figure 2:
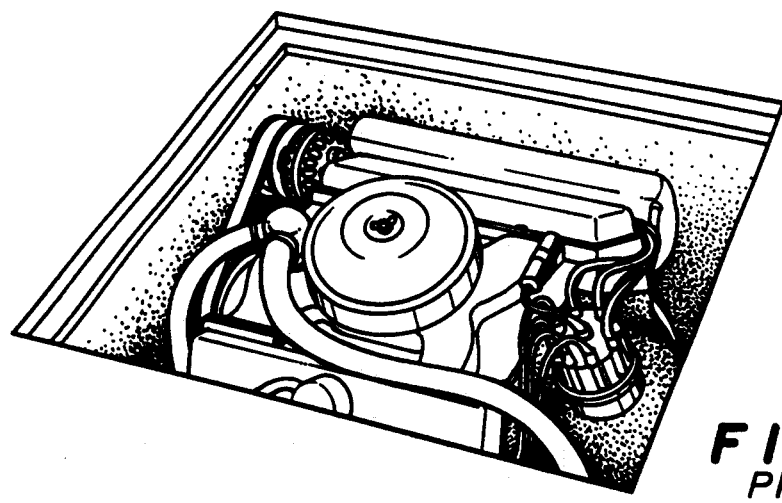
FIG. 2 is a photographic view of the crowded engine bay area of the boat of FIG. 1.
Figure 3:
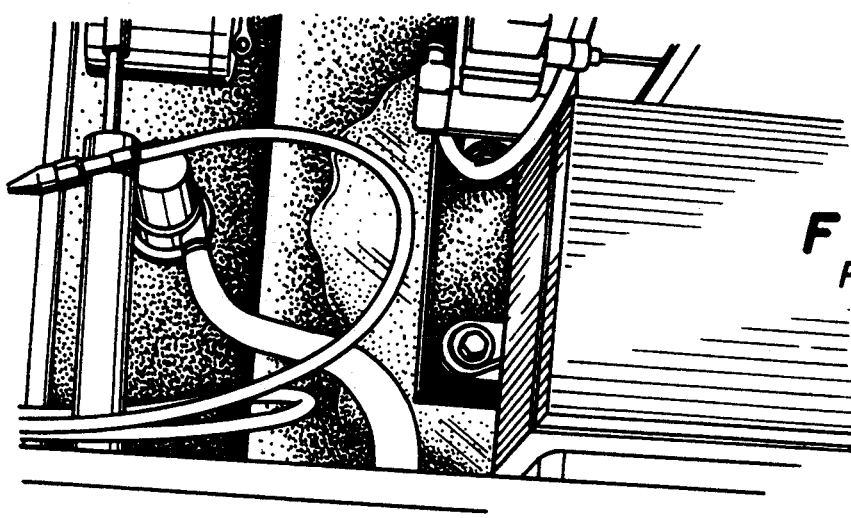
FIG. 3 is a photographic view of the foul and unclean bilge area of the boat of FIG. 1.
Figure 4:
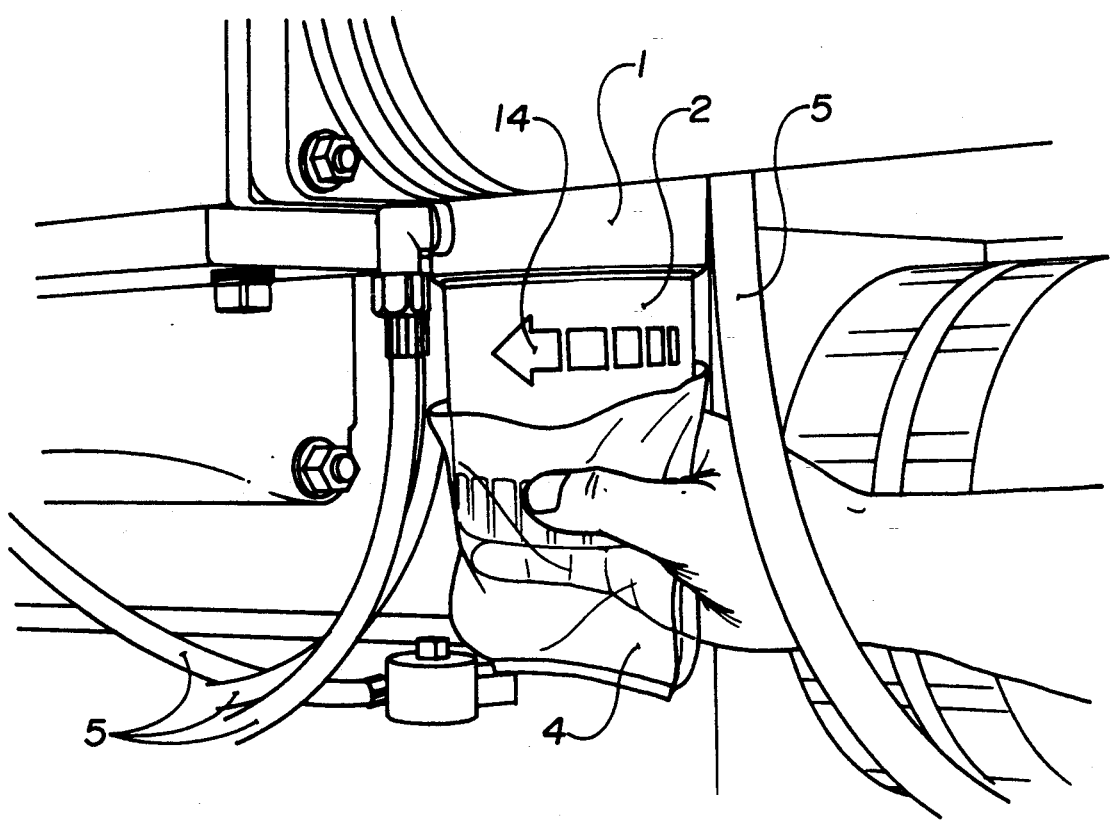
FIG. 4 is a pictorial view showing the prior art method of removing an oil filter cartridge from the marine engine using a plastic bag to catch oil that escapes during cartridge removal and to dispose of the cartridge; also shown are the cramped conditions in the environment where the cartridge is removed. The arrow 14 shows the direction in which the cartridge is turned for removal.
Figure 5:
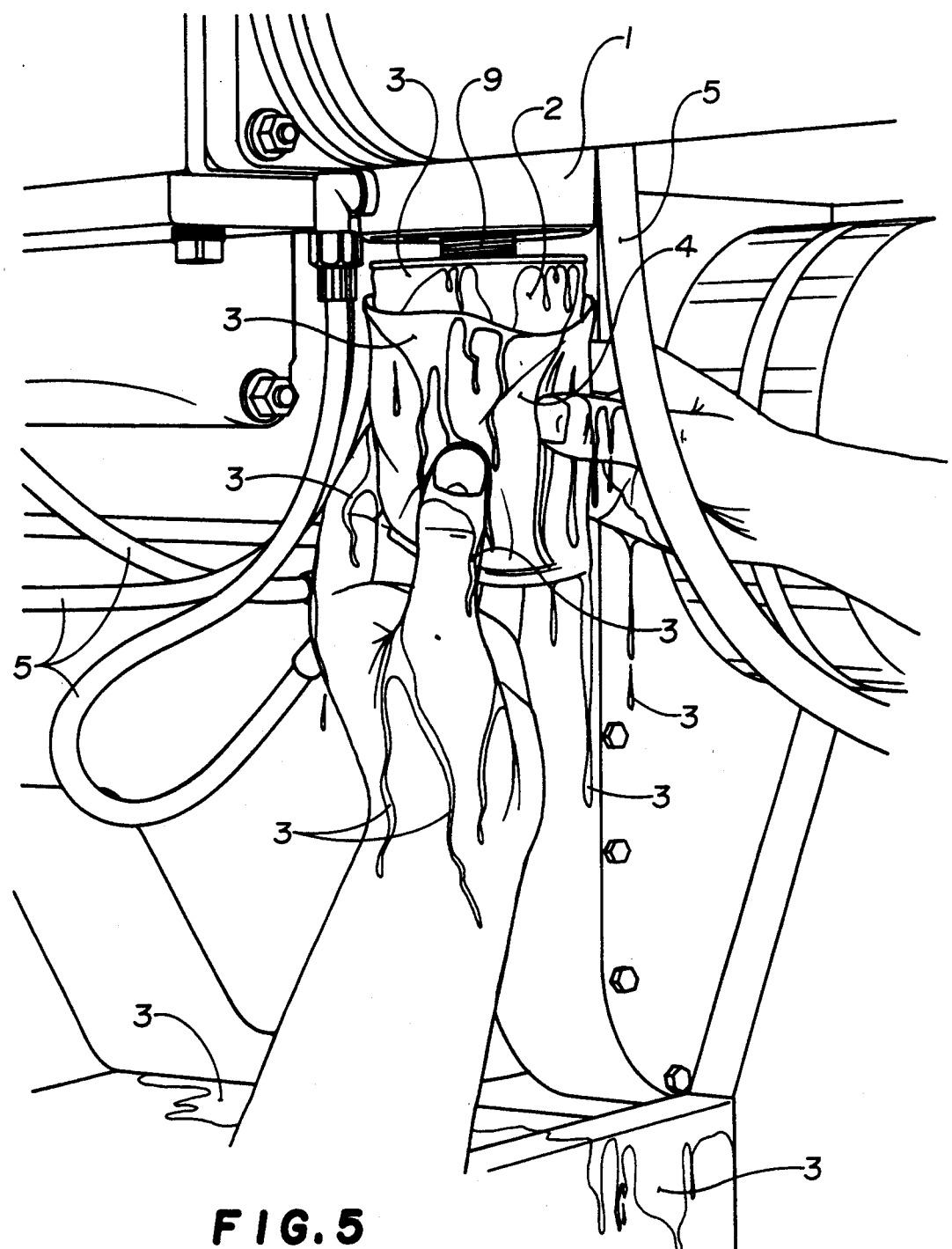
FIG. 5 corresponds substantially to FIG. 4, but shows the oil escaping from filter itself as well as from the plastic bag during removal of the cartridge.
Figure 6:
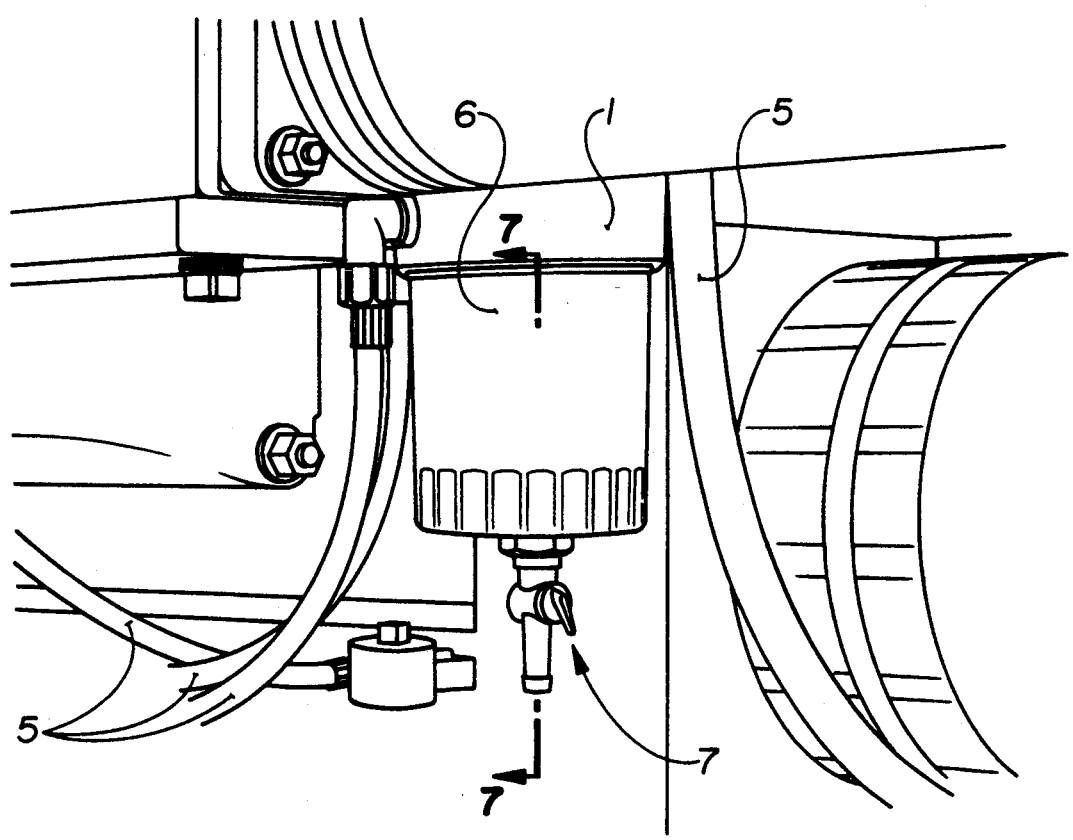
FIG. 6 is a pictorial view showing the oil filter cartridge of the present invention affixed to the engine, and further showing the valve affixed to the filter cartridge.

The present invention is designed particularly to relieve the problem of oil changes in marine engines, wherein the engine is in cramped quarters of an engine compartment (FIGS. 2 and 3), which is made even more cramped by hoses 5 and pipes being present in the engine compartment (FIGS. 4 and 5). If engine oil 3 escapes during the changing of the oil filter 2, the oil drops into the bilge (FIG. 3) and is then pumped into the water where pollution occurs. In an effort to keep oil from dropping into the bilge, the oil changer caught the oil escaping during removal of the oil filter cartridge 2 in a plastic bag 4 (FIGS. 4 and 5). Of course, this was inefficient and in many instances oil escaped and dripped from the bag and dirtied the hands as well as the boat. Moreover, the bag and contents presented a disposal problem. With as much as a quart of oil being contained in the filter cartridge, non-polluting disposal oil and filter cartridge in the plastic bag presented a problem.

Figure 12:
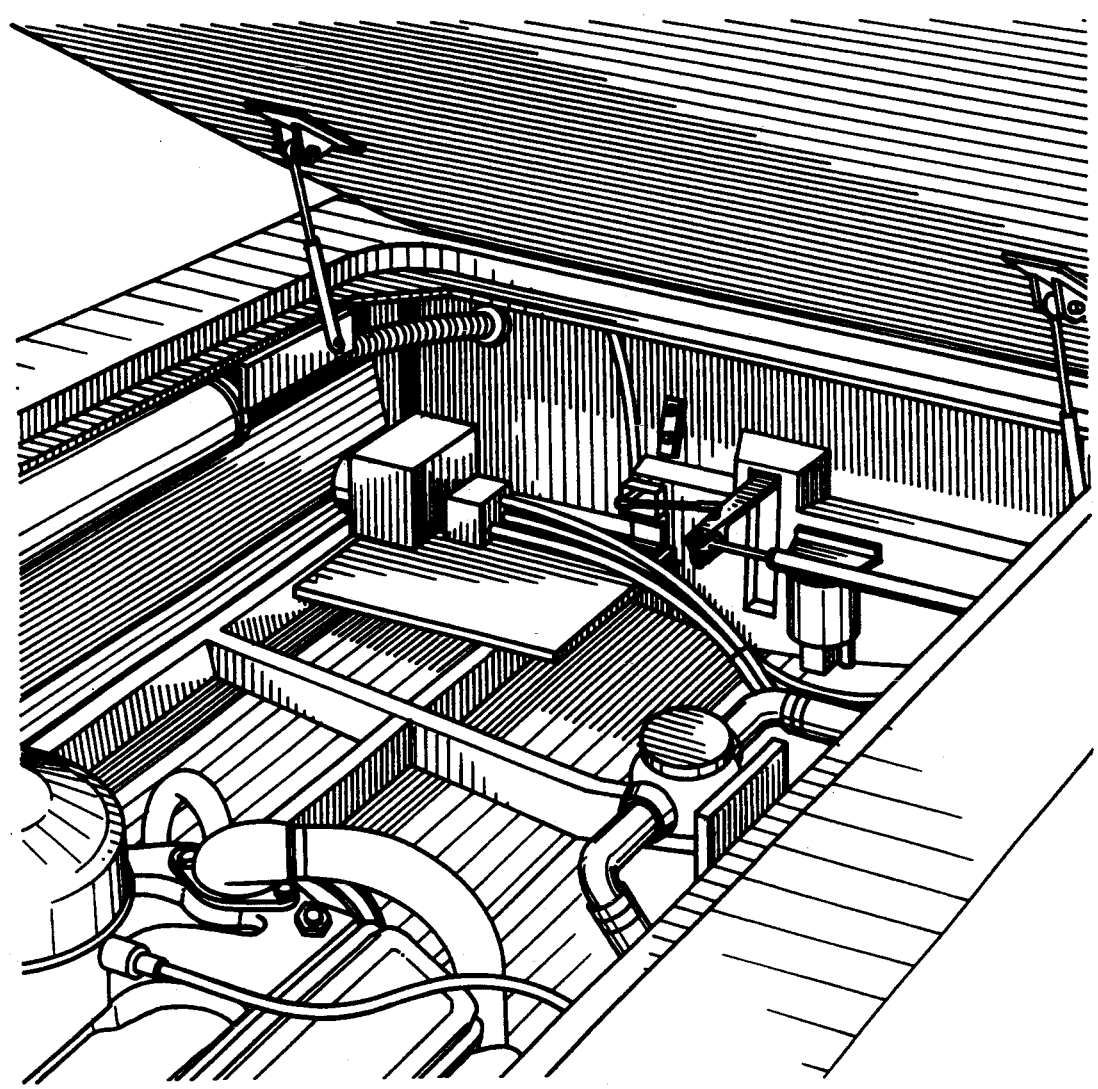
FIG. 12 is a photographic view of a clean bilge area as a result of employing the valved filter cartridge of this invention.

Instead of the use of plastic bags 4 (as used by the prior art) to capture residual oil spills 6 and then removing the oil filter cartridge 2, the invention herein involves an oil filter cartridge 6 having a valve 7 built into the cartridge 6 so that residual oil remaining in the filter cartridge 6 can be drained by opening the valve 7 and allowing the residual oil to run directly into a storage container 8 for reuse or non-polluting disposal. As a result of using the special valved oil filter cartridge and method of this invention the engine bilge area is spotless (FIG. 12).

Figure 7:
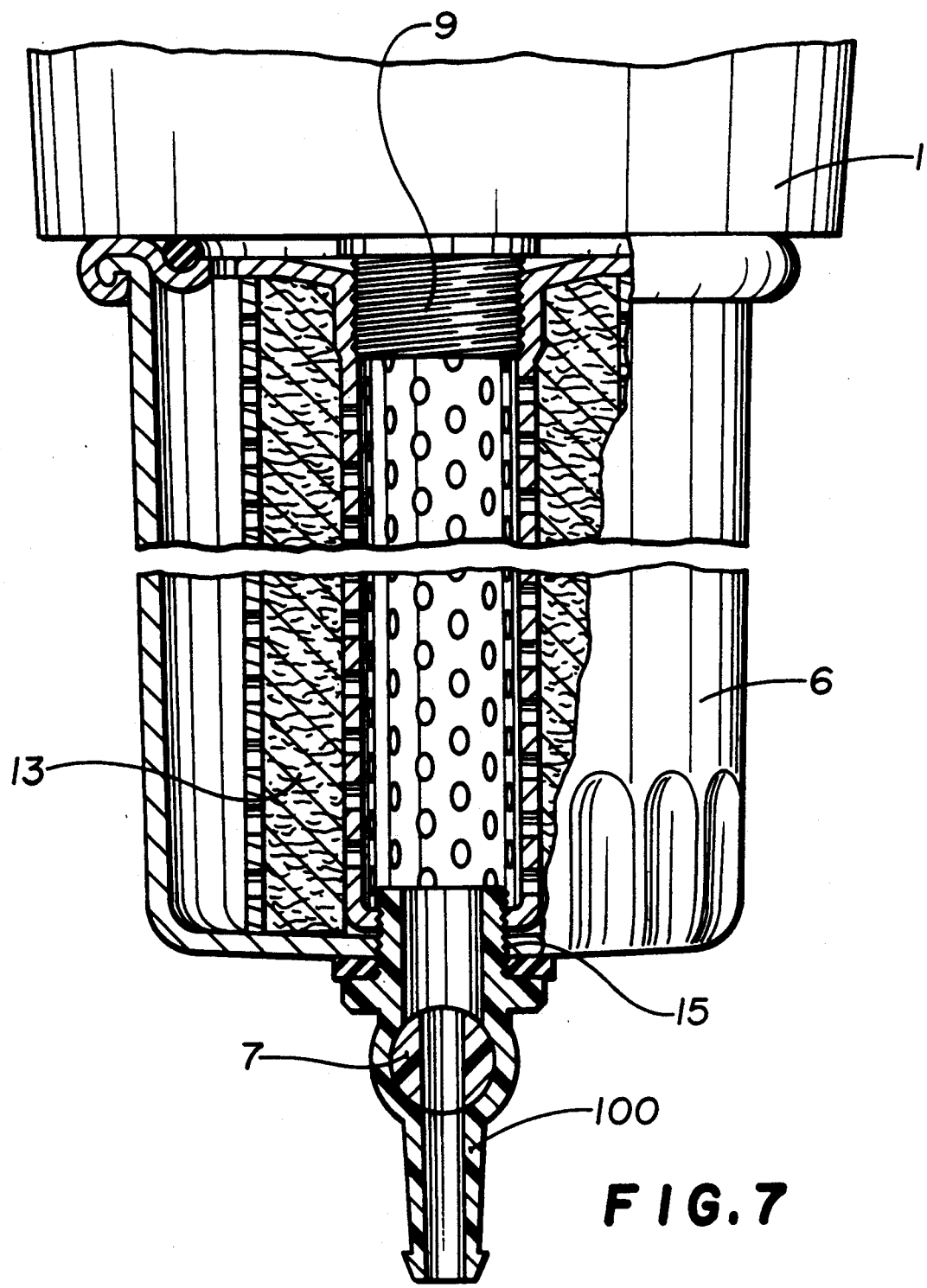
FIG. 7 is a cross-sectional view thereof, partly in elevation, taken across the lines 7—7 of FIG. 6 and drawn to an enlarged scale, the valve being shown in the open position, and the filter material 13 and thread 15 for attaching valve being shown.
Figure 8:
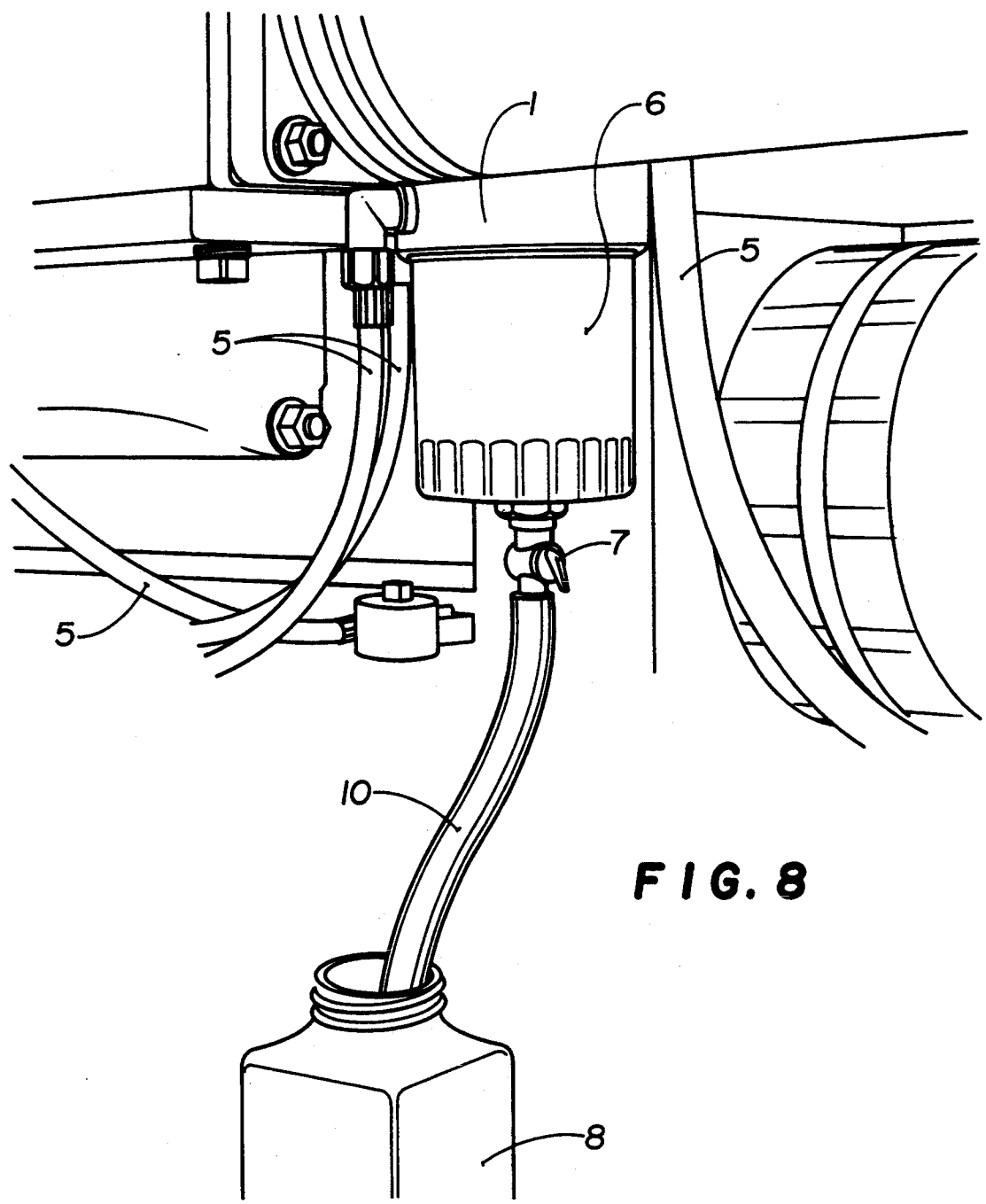
FIG. 8 shows the oil filter cartridge of the present invention with valve attached to a hose to drain residual oil (remaining in the filter itself) into a suitable container.
Figure 10:
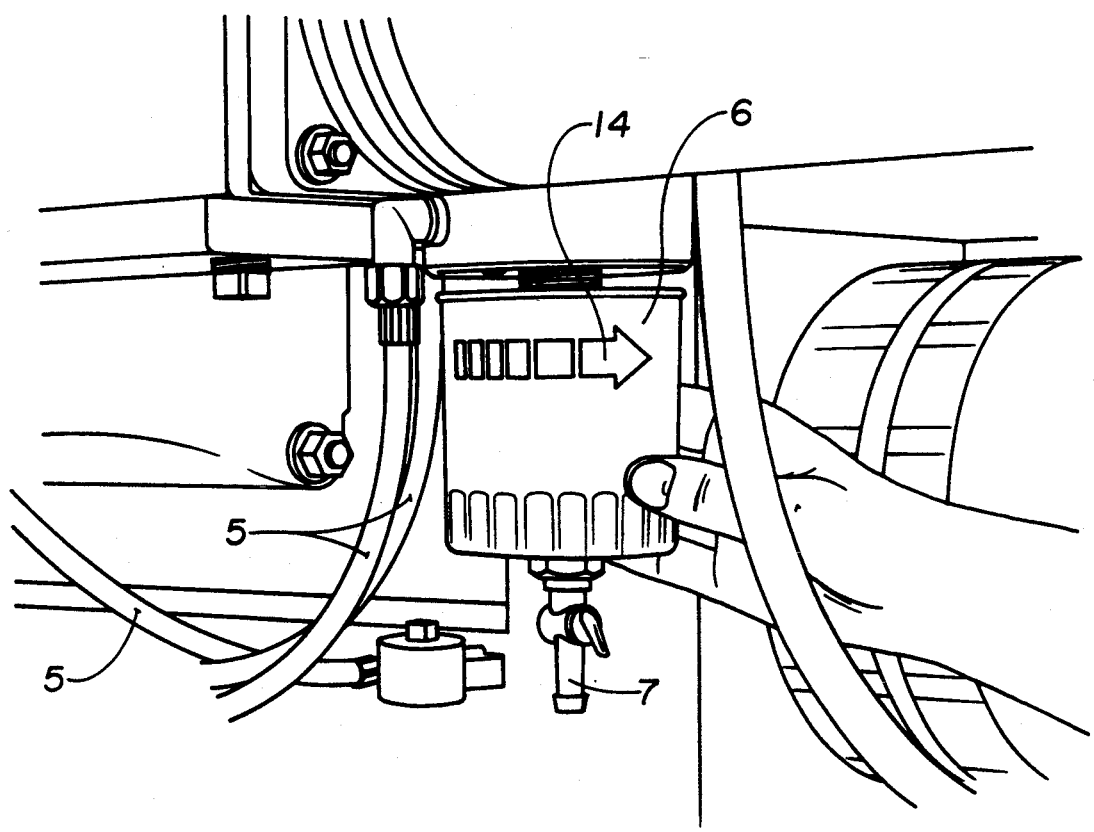
FIG. 10 shows a new oil filter cartridge being refitted to the engine. The arrow shows the direction that the cartridge is turned for replacement on the engine.
Figure 11:
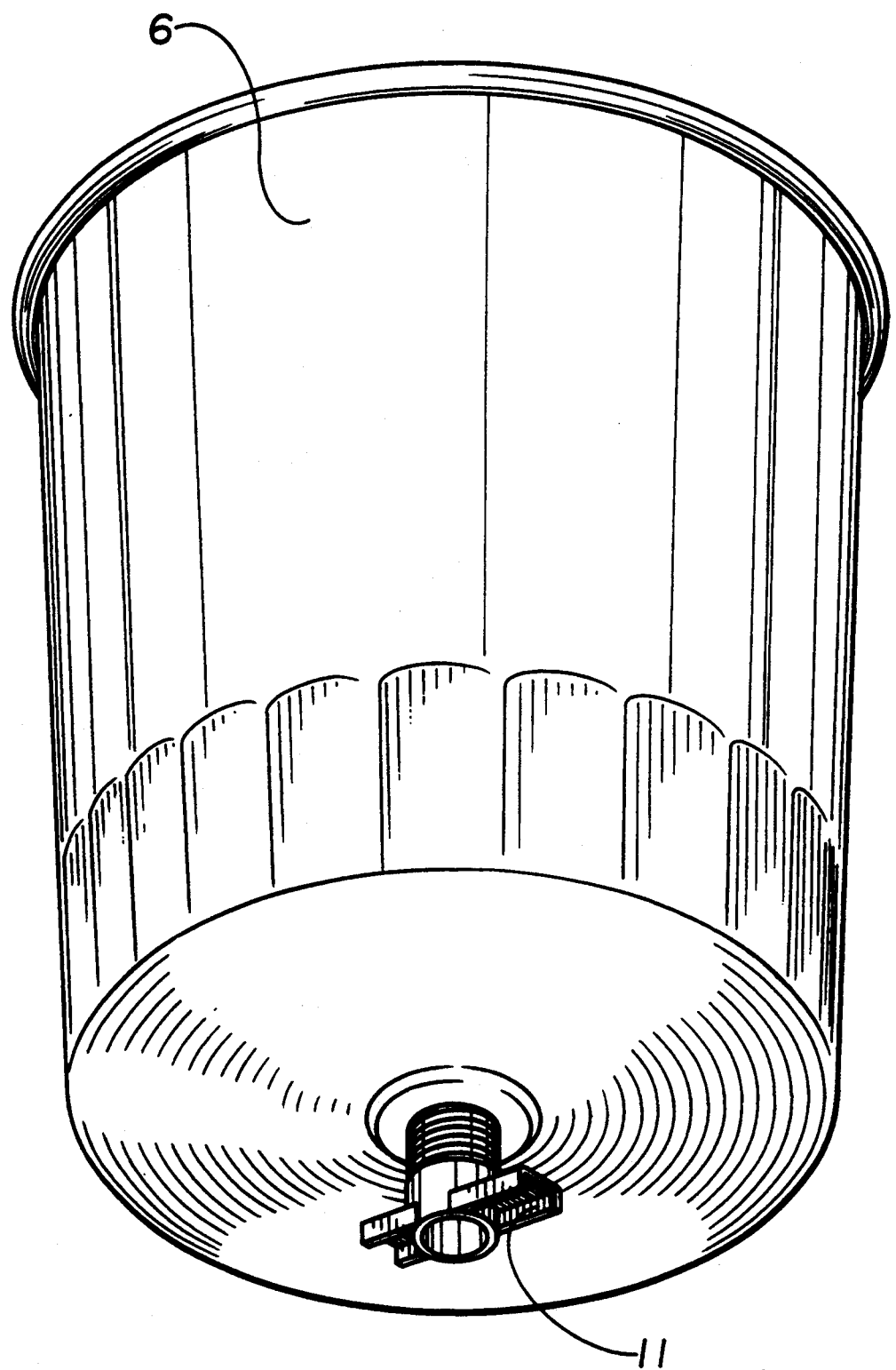
FIG. 11 is a modification, showing an oil filter cartridge having a petcock valve 11 rather than the valve shown in the previous drawings.

In a further embodiment, an oil filter cartridge 6 with a valve 7 is attached to an engine 1, through threaded means 9, the engine 1 is drained of crankcase oil and then the residual oil is drained by use of the valve 7 on the cartridge 6. As shown clearly in FIG. 7, a nipple 100 is carried by the bottom of the filter 6 and has the valve 7 disposed therein. This valve 7 may be turned about an axis which is transverse to the central longitudinal axis of the filter as shown in FIG. 8. A hose 10 may be placed on a lower portion of the nipple 100, as shown clearly in FIG. 8, to lead residual oil into a container 8 for disposal. Instead of a valve on the cartridge 6, the valve may be substituted by a closed orifice which could be readily opened to drain any residual oil in the cartridge. As an example of a substitute for the valve on the cartridge, a petcock 11 may be substituted. Bag 12 can be used to dispose of the used filter cartridge.

While the preferred embodiment of this invention designates a valve for release and recovery of oil; also contemplated is a drain plug for release and recovery of the waste oil. Those skilled in the art realize that other equivalent valve and release means are known in the art and these come within the purview of this invention.

The marine engine is a typical example of the engines with which the teaching of the present invention may find most particular utility, but it will be appreciated by those skilled in the art that the present invention is not necessarily confined thereto.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a marine engine, wherein the marine engine is in the close quarters of an engine compartment having a bilge, wherein the bilge has a bilge pump for pumping out the bilge into the water, wherein the marine engine includes a crankcase and further includes a replaceable oil filter cartridge having a top opening in communication with the marine engine, wherein the replaceable oil filter cartridge is replaced following drainage of the oil from the crankcase of the marine engine, and wherein the replaceable oil filter cartridge has residual oil therein, the residual oil spilling out and flowing into the bilge when the replaceable oil filter cartridge is replaced, and the bilge pump pumping out the oil in the bilge and thereby polluting the water, the improvement comprising the replaceable oil filter cartridge having a bottom surface provided with a bottom opening formed therein, a nipple cartridge the replaceable oil filter, the nipple being in communication with the bottom opening, extending below the bottom surface of the oil filter cartridge, and having a lower portion, such that a hose may be fitted onto the lower portion of the nipple, and a valve means in the nipple in the replaceable oil filter cartridge in communication with the bottom opening therein, and disposed between the bottom opening and the lower portion of the nipple such that after the oil has been drained from the crankcase, the valve means may be opened to drain the residual oil out of the opening in the replaceable oil filter cartridge, through the nipple and hose, and into a suitable container prior to removal of the replaceable oil filter cartridge, thereby preventing the residual oil from flowing into the bilge, and thereby preventing the water from being polluted when the bilge is pumped out.

2. The improvement of claim 1, wherein the replaceable oil filter cartridge has a central longitudinal axis, and wherein the opening in the bottom surface of the replaceable oil filter cartridge and the nipple carried by the replaceable oil filter cartridge are substantially aligned with the central longitudinal axis of the replaceable oil filter cartridge.

3. The improvement of claim 2, wherein the valve means is turned about an axis which is transverse to the central longitudinal axis of the replaceable oil filter cartridge.

4. The method of replacing the oil filter in a marine engine after the crankcase oil has been drained therefrom, thereby preventing the residual oil in the filter from spilling into the bilge, and thereby protecting the environment from pollution whenever the bilge is pumped out, comprising the steps of providing the oil filter with a nipple extending below the filter and in communication therewith, providing a valve within the nipple, providing a suitable container and positioning the container below the nipple, opening the valve such that the residual oil in the filter flows through the nipple and into the container, thereby preventing the residual oil from spilling into the bilge, and such that the residual oil is collected in the container for recycling, unscrewing the filter from the engine, such that the filter may be placed in a bag for subsequent disposal in a landfill or the like, the filter being free of residual oil such that the landfill is not polluted by the oil, providing a new oil filter, and screwing the new oil filter into the marine engine so that the new oil filter is hand tight.

5. The method of claim further comprising the steps of providing the nipple with a lower portion, providing a hose having a pair of ends, fitting one end of the hose on to the lower portion of the nipple, and placing the other end of the hose in the container.

6. The method of claim 5, further comprising the steps of disposing the valve between the filter and the lower portion of the nipple, and providing the valve with an axis of rotation which is transverse to the central longitudinal axis of the filter, and turning the valve by less than a half-turn to drain the residual oil out of the filter, past the valve, through the nipple and hose, and into the container.

* * * * *

UNITED STATES PATENT AND TRADEMARK OFFICE
CERTIFICATE OF CORRECTION

PATENT NO. : 5,366,400
DATED : November 22, 1994
INVENTOR(S) : Kucik

It is certified that error appears in the above-identified patent and that said Letters Patent is hereby corrected as shown below:

Column 7, Line 29, "Cartridge" should read

---carried by---.

Signed and Sealed this

Twenty-fifth Day of April, 1995

*Attest:*

BRUCE LEHMAN

*Attesting Officer*     Commissioner of Patents and Trademarks